United States Patent [19]

Huhndorff

[11] Patent Number: 4,871,553

[45] Date of Patent: Oct. 3, 1989

[54] CELL CIRCUIT INTERRUPTER

[75] Inventor: Harry R. Huhndorff, Bay Village, Ohio

[73] Assignee: Eveready Battery Company, Inc., St. Louis, Mo.

[21] Appl. No.: 263,303

[22] Filed: Oct. 27, 1988

[51] Int. Cl.$^4$ .............................................. H01M 2/34
[52] U.S. Cl. ......................................... 429/61; 429/66
[58] Field of Search ........................ 429/61, 66, 58, 56

[56] References Cited

U.S. PATENT DOCUMENTS

| | | | |
|---|---|---|---|
| 2,651,669 | 9/1953 | Neumann | 136/182 |
| 3,081,366 | 3/1963 | Belove | 136/6 |
| 3,373,057 | 3/1968 | Jost et al. | 136/6 |
| 3,617,386 | 11/1971 | Bosben | 136/107 |
| 3,676,221 | 7/1972 | Bach | 136/111 |
| 3,775,661 | 11/1973 | Frezzolini et al. | 320/46 |
| 4,025,696 | 5/1977 | Tucholski et al. | 426/61 |
| 4,690,879 | 9/1987 | Huhndorff et al. | 429/61 |
| 4,756,983 | 7/1988 | Tucholski | 429/61 |
| 4,818,641 | 4/1989 | Ledenican | 429/61 |

OTHER PUBLICATIONS

Copending patent application Ser. Nos. 177,259, filed Apr. 4, 1988; 177,241, filed May 4, 1988; 177,260, filed Apr. 4, 1988; 237,025, filed Aug. 29, 1988; and 289,656, filed Dec. 22, 1988.

Primary Examiner—Donald L. Walton
Attorney, Agent, or Firm—Virgil B. Hill

[57] ABSTRACT

The invention relates to a galvanic cell having a failsafe circuit interrupter means for electrically isolating one cover terminal of the cell from the cell's electrochemical system in which the closed end of the container is modified so that the closed end of the container can bulge beyond a predetermined amount in response to internal pressure buildup.

19 Claims, 1 Drawing Sheet

U.S. Patent     Oct. 3, 1989     4,871,553
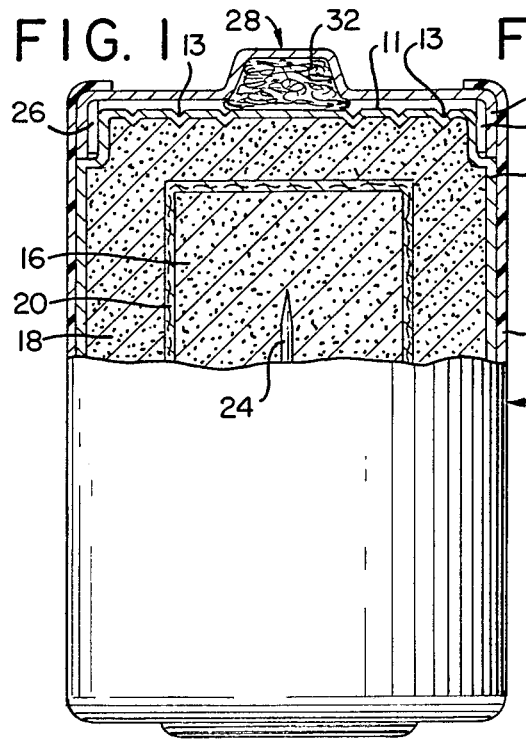
FIG. 1
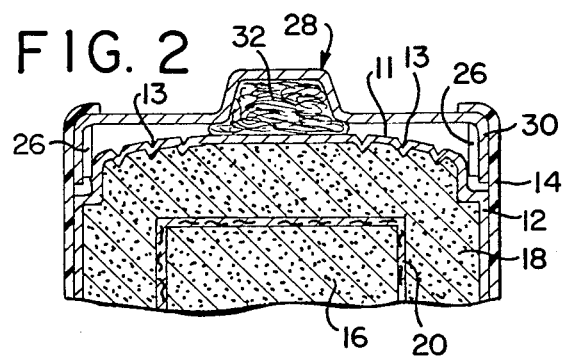
FIG. 2
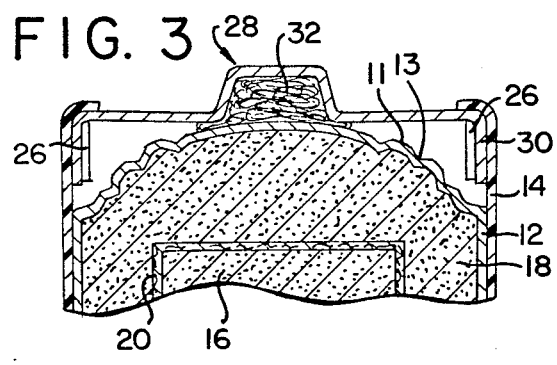
FIG. 3
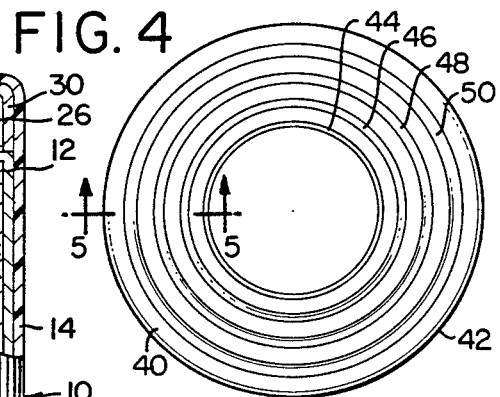
FIG. 4
FIG. 5
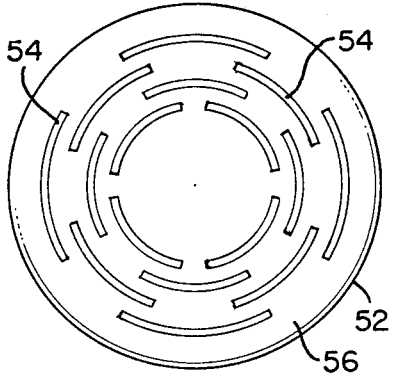
FIG. 6
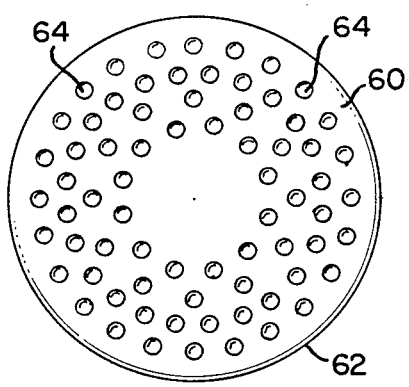
FIG. 7

CELL CIRCUIT INTERRUPTER

FIELD OF THE INVENTION

The invention relates to a galvanic cell and more specifically to a cylindrical galvanic cell having a failsafe circuit interruption means for electrically isolating one terminal of the cell from the cell's electrochemical system in which the closed end of the cylindrical container is modified so that it will bulge beyond a predetermined amount when subjected to an internal pressure buildup.

BACKGROUND OF THE INVENTION

Galvanic cells, such as alkaline cells, are generally designed to vent when the internal pressure exceeds a predetermined amount. When exposed to an abuse condition, such as being charged to an excessive degree, the cell is designed to vent and allow gas to escape. Under certain abuse conditions, electrolyte entrained in the gas may be forced from the cell. It is preferable to have the electrolyte escape rather than have the cell rupture from internal pressure buildup.

Cell manufacturers have used a number of approaches to resolve the problem of expelling electrolyte during venting. One method of preventing seal rupture due to abuse charging or the like is to insert a diode in the battery's electrical circuit. By eliminating the possibility of charging the cells, internal gas is not generated and the seal never ruptures. Another electrically related mechanism is a belleville shaped "flip switch". This device is triggered by bulging of the closed end of the cell's cylindrical container which causes a washer to invert and thereby break electrical contact. Another method involves the use of absorbents or electrolyte thickeners. The absorbent materials are usually located outside the seal area and beneath the cell's cover or jacket. As electrolyte escapes from a ruptured seal, the liquid is absorbed. Spew thickeners are mixed with the electrolyte and therefore are contained within the cell. The objective of the thickener is to slow down and/or absorb any leakage that may occur. The disadvantage of using either an absorbent or a thickener is that both materials tie up space that otherwise could be used for active materials of the cell. A third procedure is to use an outer container and end covers as an electrolyte containment system to provide space to contain the electrolyte that may escape.

U.S. Pat. No. 3,676,221 discloses a battery comprising a plurality of stacked, disk-like sealed cells secured together by cups fitted over one cell and having bottoms spot-welded to the next cell and sidewalls spot-welded to the interfitting cell. A heat-shrunk sheath encloses the battery and has caps forming the poles. Between each pair of cells is a circular disc of insulating material against which the cup bottoms bulge upon expansion of the contents of the cells, thereby breaking the welds and electrically disconnecting the cells.

U.S. Pat. No. 4,025,696 describes a disk shaped washer which inverts after the bottom bulge exceeds a predetermined value. Prior to activation, the washer's inside diameter is slanted toward the container. As the container bulges, the bottom of the container pushes against the washer and eventually causes the washer to invert. This inversion electrically separates the bottom cover from the container. An open circuit is the net result.

U.S. Pat. No. 3,775,661 describes a cell in which internal pressure forces a diaphragm against a switch which electrically disconnects a charging device. The diaphragm is located inside a venting device which is attached to one end of the cell.

U.S. Pat. No. 2,651,669 describes a bulge activated switch that can be incorporated into a single cell battery or a multiple cell battery and operable such that the bulge can be used to open a switch or switches that control the cell's discharging and/or charging circuits.

U.S. Pat. No. 3,617,386 describes a cell in which a thin sheet of metal with "spring back" ability is positioned between the seal and cover of the cell so as to break the cell's electrical circuit when the bulge becomes excessive.

U.S. Pat. No. 3,081,366 describes a sealed cell having a metallic sheet member connected to one cell electrode and its periphery insulating affixed to an open casing end and an overlying exposed metallic terminal insulating held over the sheet member. A movable switch portion normally connects an intermediate pressure-deflectable sheet member portion to the external terminal and, in response to outward motion of the deflected sheet portion under excess internal pressure the switch portion disconnects the external terminal from the deflected sheet portion.

U.S. Pat. No. 3,373,057 describes a cell in which the cover of the casing of the cell is provided centrally with an inwardly concave-contact button. A dished (which is to say concave-convex) snap-acting spring disc of the automatic reset type is marginally sealed to the inside of the cover. An automatic reset disc after snapping in one direction in response to pressure on its convex side will return with snap action when the pressure is relieved. The disc is provided centrally with a sealed movable contact for engagement and disengagement with an internal fixed contact when the disc snaps to and fro. The arrangement is such that when the contacts are engaged the disc is slightly sprung toward the cover but short of causing snap action. This maintains good electrical contact pressure under safe internal gas pressures. The fixed contact is electrically connected with one set of battery plates and the other set of plates is electrically connected with the casing.

U.S. Pat. No. 4,690,879 describes a cylindrical galvanic cell employing a unitary type cover welded to the container as a failsafe circuit interruption means for electrically isolating one terminal of the cell from the cell's electrochemical system when the bottom of the cylindrical cell bulges beyond a predetermined amount so that the unitary cover breaks electrical contact with the housing of the cell.

U.S. Pat. No. 4,756,983 describes a cylindrical galvanic cell employing a cover having a peripheral flange electrically contacting the conductive container of the cell and whereby a predetermined bulge in the bottom of the container will cause the central portion of the cover to separate from the peripheral flange portion thereby electrically isolating the central portion of the cover from the cell.

It is therefore an object of this invention to provide a galvanic cell with a more accurate means for electrically isolating one terminal of the cell from the cell's electrochemical system upon reaching a predetermined internal pressure in the cell's housing.

Another object of this invention is to provide means for electrically isolating one terminal of a galvanic cell from the cell's electrochemical system upon reaching a predetermined bulge in the cell's housing and that will occupy minimum additional space so as not to significantly diminish the space allocated for the active components of the cell.

Another object of this invention is to provide a sealed galvanic cell with means for electrically isolating one terminal of the cell from the electrochemical system of the cell upon reaching a predetermined bulge in the cell's housing and that is easy to make, cost effective and easy to assemble.

The foregoing and additional objects will become more fully apparent from the following description and the accompanying drawing.

SUMMARY OF THE INVENTION

The invention relating to a sealed galvanic cell comprising a conductive container having an upstanding wall open at one end and closed at the opposite end and including in said container a positive electrode, a negative electrode and an electrolyte, said conductive container being in electrical contact with one of said electrodes; a first cover mounted over, secured to and electrically insulated from said open end of said conductive container and in electrical contact with the other electrode; a second cover secured over the closed end of the container and the center portion of the second cover electrically insulated from the center portion of closed end of the container with the peripheral portion of the second cover in electrical contact with the container thereby adapting said second cover as the terminal for the electrode in electrical contact with said container; the surface of said closed end of the container weakened by disturbances in the surface so that the surface will bulge to a greater degree than an unweakened surface of a closed end of an identical container that has no disturbance when the surfaces are subjected to an internal pressure buildup within the container; and wherein the closed end of the container will bulge upon a predetermined pressure buildup within the container to force the second cover to break the electrical contact with the container thereby breaking the electrical contact between the second cover and the electrode in electrical contact with said container.

The surface of the closed end of the conductive container could be weakened against an axial force by imparting disturbances onto the surface by mechanical means such as punching, stamping, forming or the like, or by chemical means such as etching. The essential requirement is that the surface of the closed end of the container be weakened by imparting surface disturbances so that the surface will bulge (i.e., deflect) more than a surface that has not been weakened. Preferably, the disturbances should be substantially symmetrically disposed about the center area of the surface of the closed end of the container so that upon buildup of internal pressure within the container, the center area of the surface of the closed end of the container can respond to such internal pressure by bulging outward. The second cover secured to the closed end of the container will then be forced outward by the bulge in the closed end of the container to a point where the electrical contact between the container and the second cover can be broken. This will effectively electrically isolate the second cover terminal of the cell from the cell's electrochemical system. The modification or weakening of the closed end of the container could be accomplished for example by imparting arcuate grooves around and extending from the central area of the surface of the closed end of the container, concentric circular grooves around and extending from the central area of the surface of the closed end of the container, dimples around and extending from the central area of the surface of the closed end of the container, or any other disturbance in the surface of the closed end of the container that will weaken the surface so that pressure applied against the surface will cause the surface to bulge more than a surface of a closed end of an identical container that had not been weakened. In another embodiment, concentric circular grooves could be disposed around the central area of the closed end of the container and the width and/or depth of each circular groove could increase the further the groove was located from the center of the closed end of the container. In this embodiment, the center area of the closed end of the container would be able to more easily deflect or bulge from internal pressure buildup.

The location, shape, number and depth of the disturbances can be easily selected to insure that the surface of the closed end of the container will bulge a predetermined amount in response to a particular pressure buildup within the cell. By properly selecting the disturbances to be imparted to the surface of the closed end of the container, the cell can be made to bulge to a preselected degree in response to an internal pressure that is below the minimum pressure required to rupture the primary seal between the first cover and the container and yet above the pressure which the cell might experience during normal operation. The size of the container and the thickness of the closed end of the container have to be considered when selecting the proper or preferred disturbances to be incorporated in the closed end of the container. For example, a thicker material for the closed end of container would generally require deeper disturbances in the surface to weaken the surface sufficiently to insure that the surface will bulge to a degree desired upon a predetermined internal pressure buildup.

In the preferred embodiment of the invention, the disturbances would comprise arcuate grooves, circular grooves or a combination thereof disposed substantially concentric about the central area of the surface of the closed end of the container. This will weaken the closed end of the container so that the center area will deflect or bulge to a greater degree than the remaining surface of the closed end of the container. The bulge will project outward from the container such that the center area will force or project outwardly any member it contacts. Thus by having a rigid cover secured to the closed end of the container with only the peripheral segment making electrical contact with the container, the central area of the closed end of the container can be made to respond to internal pressure buildup that will be sufficient to force the rigid cover away from the container to a degree that will breach the electrical contact between the cover and the container. The cover could be secured to the closed end of the container using any conventional means disclosed in the art. For example, the peripheral area of the cover could be welded to the container in which such welds can be broken in response to bulging of the closed end of the container. The cover could have a dependent flange that could be forceably slid onto the closed end of the container in an interference fit whereupon bulging of the closed end of the container could cause the cover to slide off the container and break the electrical contact between the cover and the container.

Another embodiment of a cell would comprise the use of a rigid second cover terminating with a dependent flange that has internal spaced-apart longitudinal ribs. The ribs would provide an interference fit between the cover and the closed end of the container of the cell. In this embodiment, the cover would be secured onto and in electrical contact with the container with an interference fit and when the closed end of the conductive container bulges upon a predetermined value due to the pressure buildup within the conductive container, the bulged container forces the second cover to slide off from the container and break the engagement between the ribs in the flange and the upstanding wall of the container thereby breaking the electrical contact between the second cover and an electrode in electrical contact with said conductive container.

Another embodiment of a cell could be made in which the external surface of the upstanding wall of the container adjacent the closed end of the container could have a surface disturbance, and a rigid second cover could terminate with a dependant flange in which the internal surface of the dependant flange has a surface disturbance adapted for mating in engagement with the surface disturbance on the upstanding wall so that when the cover is placed onto the closed end of the container the disturbance in the flange will snap into engagement with the disturbance of the upstanding wall of the container. In this embodiment, the cover would be secured onto and in electrical contact with the container and when the closed end of the conductive container bulges upon a predetermined value due to the pressure buildup within the conductive container, the bulged container forces the second cover to unsnap and slide off from the container and break the engagement between the disturbance in the flange and the upstanding wall of the container thereby breaking the electrical contact between the second cover and an electrode in electrical contact with said conductive container.

The cover could be secured at the center of the closed end of the container using an electrically nonconductive adhesive as long as the peripheral area of the cover contacts the container to make electrical contact therebetween. Also, the cover could be secured to the container using a shrink film extending over the closed end of the container and extending onto the peripheral portion of the cover. A necessary feature of this invention is that the cover make electrical contact with the container and be disposed such that when the closed end of the container bulges, the cover can be projected away from the container and break the electrical contact with the container.

In a preferred embodiment of the invention, the cover would have a depending flange and the upstanding wall of the container adjacent the closed end of the container would be indented by an amount equal to or greater than the thickness of the flange of the cover. In this embodiment, when the cover would be secured onto the closed end of the container, the flange of the cover will be placed onto the indented portion of the container so that the flange would be in alignment with the overall circumferential surface of the container. This will produce a cell having a relatively constant outer peripheral wall.

The center area of the second cover can be electrically insulated from the center area of the closed end of the container using an electrically insulating material. As used herein, the electrically insulating material could be a disc made of plastic tape, paper, ceramic or it could be a layer of an electrically nonconductive adhesive. When an insulating material is a disc, the disc could be conductive or nonconductive provided that if it is conductive it must be secured to the closed end of the conductive container using a nonconductive adhesive. In some applications the disc could also be secured to the conductive cover by conventional means.

The conductive cover should preferably be rigid so that as the closed end of the container bulges, the conductive cover will remain relatively flat thereby assuring that it will move away from the container and break electrical contact with the conductive container. In other words, the bulge of the closed end of the container will be sufficient to move the cover away from the container and thereby electrically isolate the cover from the conductive container.

The insulating material could be an electrically nonconductive adhesive that secures the inner area of the conductive cover to the closed end of the container. Suitable nonconductive adhesives for this invention are asphalt, acrylic type adhesives, epoxy type adhesives, cyanoacrylate type adhesives, silicone type adhesives, hot melts and the like.

The nonconductive adhesive should be applied so that it bonds the conductive cover to the closed end of the container with sufficient strength to prevent tipping of the conductive cover when the cell bulges. In addition, the nonconductive adhesive must allow direct electrical contact to be made between the closed end of the container and the peripheral area of the cover. If desired, a plastic film or pressure sensitive adhesive tape or tubing could encase the cell and extend over the edge of the conductive cover. The plastic film, tape or tubing could be heat shrinkable and made from a material such as polyvinyl chloride, polyvinylidene chloride and polyolefins such as polyethylene and polypropylene.

In a preferred embodiment, the container would be a cylindrical container, the electrically insulating material would be an electrically nonconductive adhesive and the cover would be a conductive disc-shaped member with a dependent flange.

The subject invention will effectively eliminate electrolyte leakage due to abusive charging or overdischarging, does not require an additional electrical component, is relatively simple to incorporate into a manufacturing process, and effectively does not take up any usable space within the cell's interior. In a preferred embodiment, an electrically nonconductive adhesive should be used to secure only a portion of the conductive cover to the container. This adhesive performs two functions. First, the adhesive holds the cover substantially perpendicular to the cell's longitudinal axis and second, the adhesive electrically insulates the cover from the conductive container after the closed end of the container bulges and breaks electrical contact between the flange of the conductive cover and the container.

In some applications the control of the degree of bulge to move the cover from the container could be somewhat critical. For commercial applications, the cover should not be electrically insulated from the container when the amount of bulge is that which normally would occur when the cell is subject to high temperature storage. Thus the degree of bulge should generally be beyond the normal bulge that can be encountered in high temperature storage but below the degree of bulge that will break the seal and let electrolyte escape. For example, in a standard type alkaline D-size cylindrical cell (2.277 inches high and 1.318 inches diameter). the bottom of the container can bulge as much as 0.025 inch when stored at 71° C. for an eight (8) week period and can vent when the bulge exceeds 0.070 inch. Consequently, for this size and type cell system, the bottom or closed end of the container should be made to bulge between about 0.030 to about 0.070 inch during electrical charging and the cover should be made to break electrical contact with the container when such a bulge occurs.

This invention is ideally suited for alkaline cells employing an $MnO_2$ positive electrode, a zinc negative electrode and an electrolyte solution comprising potassium hydroxide.

In one embodiment of the invention, the weakening of the bottom surface of the container could be used to show or indicate the cell's electrical capacity. It is believed that as the cell's electrical capacity decreases, pressure builds up within the cell. Thus as internal pressure buildup occurs, the bottom surface of the cell's container would deflect or bulge thereby providing an indication that the cell's electrical capacity has decreased. By appropriately measuring the degree of bulge in the cell's container, a person will be able to determine the approximate electrical capacity left in the cell.

The present invention will become more apparent from the following description thereof when considered together with the accompanying drawing which is set forth as being exemplary of the present invention and is not intended to be limitative thereof in any respect.

BRIEF DESCRIPTION OF THE DRAWINGS

FIG. 1 is an elevational view partially in cross-section of an alkaline manganese dioxide zinc cell embodying a circuit interrupter means of the present invention.

FIG. 2 is an elevational view of part of the cell in FIG. 1 showing the modified bottom closed end of the container with a slight bulge insufficient to lift the cover away from contact with the container.

FIG. 3 is an elevational view of part of the cell in FIG. 2 showing the cover lifted off the container.

FIG. 4 is a view of another embodiment of this invention showing the bottom of a container in which the bottom surface has been weakened in accordance with this invention.

FIG. 5 is a side view taken through lines 5—5 of FIG. 4.

FIG. 6 is a view of another embodiment of this invention showing the bottom of a container in which the surface has been weakened in accordance with this invention.

FIG. 7 is a view of another embodiment of this invention showing the bottom of a container in which the surface has been weakened in accordance with this invention.

Referring now to FIGS. 1–3 in which a typical alkaline galvanic cell 10 of the present invention is shown comprising an inverted metallic cupped container 12 provided, if desired, with an outer plastic shrink film 14. The container 12 has a closed end surface 11 that has been modified or weakened with concentric grooves 13 around the central area of surface 11. The concentric grooves 13 weaken the surface 11 of the closed end of the container 12 so that the closed end of the container will bulge to a greater degree when subjected to an internal pressure buildup within the container 12 than an identical container in which the closed end surface had not been modified.

Disposed within the container 12 is an anode 16, a cathode 18, a separator 20 and an alkaline electrolyte which permeates the anode 16, cathode 18, and separator 20, respectively. An anode current pin type collector 24 extends lengthwise within the cell 10, parallel to the longitudinal axis of the cell, from a location in contact with the anode 16 to the negative end 26 of the cell 10 where it terminates.

A cup-shaped cover 28 is shown with its peripheral depending flange 30 secured onto the peripheral area of the upstanding wall of container 12 through an interference fit between longitudinal ribs 26 disposed on the inner surface of flange 30. Longitudinal ribs 26 are shown spaced apart and provide an interference fit with the outer surface of container 12. Prior to placing cover 28 onto the container 12, an electrically nonconductive adhesive 32 such as asphalt is placed between the closed end of container 12 and cover 28 over an area sufficient so that only the inner area of cover 28 will contact the electrically nonconductive adhesive 32 thereby leaving at least ribs 26 disposed on the inner surface of flange 30 of cover 28 in electrical contact with the upstanding wall of container 12. Shrink film or pressure sensitive adhesive tape 14 can then be shrunk over the cell and onto the peripheral area of cover 28.

FIG. 2 shows the beginning of the bulge in surface 11 of cell 10 but insufficient to lift and slide cover 28 away from container 12. After a predetermined amount of bulge occurs that is designed to slide the ribs 26 on flange 30 of cover 28 off from the upstanding wall of container 12, the cover 28 slides away from electrical contact with container 12 as shown in FIG. 3. As is evident from FIG. 3, cover 28 is still secured to container 12 via electrically nonconductive adhesive 32 but its electrical contact is broken thereby electrically isolating cover 28 from the container 12. By selecting the proper disturbance for surface 11 of container 12, the cell can be made to bulge so as to slide the cover 28 from the container 12. This invention can effectively isolate the terminal cover 28 from the circuit of the cell prior to the cell venting or rupturing which would cause electrolyte to escape.

FIGS. 4 and 5 show another embodiment of the invention in which a surface 40 of container 42 has been modified or weakened with concentric arcuate grooves 44, 46, 48 and 50 about the central area of surface 40. As shown in FIGS. 4 and 5, groove 50 is wider and deeper than groove 48 and in turn groove 48 is wider and deeper than groove 46 which is wider and deeper than groove 44. This modification of surface 40 will weaken the surface so that it will deflect or bulge more easily to internal pressure buildup.

FIG. 6 shows another embodiment of the invention in which a surface 56 of container 52 has been modified by imparting a plurality of arcuate grooves 54 about the central area of the surface 50 of container 52. This modification of surface 50 will weaken the surface so that it will deflect or bulge more easily to internal pressure buildup within the cell.

FIG. 7 shows another embodiment of the invention in which a surface 60 of container 62 has been modified by imparting a plurality of dimples 64 in surface 60. This modification of surface 60 will weaken the surface so that it will deflect or bulge more easily to internal pressure buildup.

What is claimed:

1. A sealed galvanic cell comprising a conductive container having an upstanding wall open at one end and closed at the opposite end and including in said container a positive electrode, a negative electrode and an electrolyte, said conductive container being in electrical contact with one of said electrodes; a first cover mounted over, secured to and electrically insulated from said open end of said conductive container and in electrical contact with the other electrode; a second cover secured over the closed end of the container and the center portion of the second cover electrically insulated from the center portion of closed end of the container with the peripheral portion of the second cover in electrical contact with the container thereby adapting said second cover as the terminal for the electrode in electrical contact with said container; the surface of said closed end of the container weakened by disturbances in the surface so that the surface will bulge to a greater degree than a surface of a closed end of an identical container that has no disturbances when the surfaces are subjected to an internal pressure buildup within the container; and wherein the closed end of the container will bulge upon a predetermined pressure buildup within the container to force the second cover to break the electrical contact with the container thereby breaking the electrical contact between the second cover and the electrode in electrical contact with said container.

2. The galvanic cell of claim 1 wherein the surface of the closed end of the container has at least one disturbance selected from the group consisting of concentric grooves, arcuate grooves disposed about the center area of the surface, a plurality of dimples disposed about the center area of the surface and combination thereof.

3. The galvanic cell of claim 1 wherein at least one concentric groove is disposed in the surface of the closed end of the container.

4. The galvanic cell of claim 1 wherein concentric arcuate grooves are disposed about the center area of the surface of the closed end of the container.

5. The galvanic cell of claim 4 wherein the grooves further from the center area are larger than the groove closer to the center area.

6. The galvanic cell of claim 1 wherein the second cover has a dependent peripheral flange and said flange has internal spaced apart longitudinal ribs that provide a friction fit on said closed end of the container.

7. The galvanic cell of claim 1 wherein the container is a cylindrical container.

8. The galvanic cell of claim 1 wherein an electrically insulating material insulates the center portion of the second cover from the center portion of the closed end of the container.

9. The galvanic cell of claim 8 wherein the electrically insulating material is an electrically nonconductive adhesive.

10. The galvanic cell of claim 9 wherein the electrically nonconductive adhesive is selected from the group consisting of asphalt, acrylic adhesive, epoxy adhesive, cyanoacrylate adhesive and silicone adhesive.

11. The galvanic cell of claim 1 wherein said container is in electrical contact with a positive electrode and said first cover electrically insulated from the container is in electrical contact with a negative electrode.

12. The galvanic cell of claim 1 wherein said container is in electrical contact with a negative electrode and said first cover electrically insulated from the container is in electrical contact with a positive electrode.

13. The galvanic cell of claim 1 wherein one of said electrodes is $MnO_2$, the other of said electrodes is zinc and said electrolyte solution comprises potassium hydroxide.

14. A sealed galvanic cell comprising a conductive container having an upstanding wall open at on end and closed at the opposite end and including in said container a positive electrode, a negative electrode and an electrolyte, said conductive container being in electrical contact with one of said electrodes; a cover mounted over, secured to and electrically insulated from said open end of said conductive container and in electrical contact with the other electrode; the surface of said closed end of the container weakened by disturbances in the surface so that the surface will bulge to a greater degree than a surface of a closed end of an identical container that has no disturbances when the surfaces are subjected to an internal pressure buildup within the cell; and wherein the degree of said bulge will be indicative of the degree of pressure buildup in the cell.

15. The galvanic cell of claim 14 wherein the surface of the closed end of the container has at least one disturbance selected from the group consisting of concentric grooves, arcuate grooves disposed about the center area of the surface, a plurality of dimples disposed about the center area of the surface and combination thereof.

16. The galvanic cell of claim 14 wherein at least one concentric groove is disposed in the surface of the closed end of the container.

17. The galvanic cell of claim 14 wherein concentric arcuate grooves are disposed about the center area of the surface of the closed end of the container.

18. The galvanic cell of claim 14 wherein the grooves further from the center area are larger than the groove closer to the center area.

19. The galvanic cell of claim 14 wherein the container is a cylindrical container.

* * * * *